United States Patent
Jang et al.

(10) Patent No.: US 10,499,316 B2
(45) Date of Patent: *Dec. 3, 2019

(54) METHOD AND COMMUNICATION DEVICE FOR CONTROLLING ACCESS TO A WIRELESS ACCESS NETWORK

(71) Applicant: GUANGDONG OPPO MOBILE TELECOMMUNICATIONS CORP., LTD., Dongguan (CN)

(72) Inventors: Ke-Chi Jang, Allen, TX (US); Airin Cherian, Dallas, TX (US)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 1 day.

This patent is subject to a terminal disclaimer.

(21) Appl. No.: 15/274,242

(22) Filed: Sep. 23, 2016

(65) Prior Publication Data

US 2017/0013541 A1    Jan. 12, 2017

Related U.S. Application Data

(63) Continuation of application No. 13/558,665, filed on Jul. 26, 2012, now Pat. No. 9,480,000.

(Continued)

(51) Int. Cl.
*H04W 48/06* (2009.01)
*H04W 4/70* (2018.01)
(Continued)

(52) U.S. Cl.
CPC .......... *H04W 48/06* (2013.01); *H04W 4/70* (2018.02); *H04W 28/0284* (2013.01);
(Continued)

(58) Field of Classification Search
CPC ... H04W 4/005; H04W 48/06; H04W 74/006; H04W 74/0875; H04W 28/0284; H04W 48/12

See application file for complete search history.

(56) References Cited

U.S. PATENT DOCUMENTS

| | | | |
|---|---|---|---|
| 5,276,911 A | 1/1994 | Levine et al. | |
| 8,514,778 B1 * | 8/2013 | Fang | H04W 4/06 370/328 |

(Continued)

FOREIGN PATENT DOCUMENTS

| | | |
|---|---|---|
| WO | 2011/127710 A1 | 10/2011 |
| WO | 2011134378 A1 | 11/2011 |

OTHER PUBLICATIONS

3GPP TR 23.888 V1.6.1 3rd Generation Partnership Project; Technical Specification Group Services and System Aspects; System Improvements for Machine-Type Communications (Release 11), Feb. 2012.

(Continued)

*Primary Examiner* — Walter J Divito
*Assistant Examiner* — Anthony Luo
(74) *Attorney, Agent, or Firm* — Finnegan, Henderson, Farabow, Garrett & Dunner LLP

(57) ABSTRACT

A method for controlling access to a wireless Access Network (AN) by a wireless communication device. The device stores a Device Access Priority (DAP) level based on characteristics of the device. When the device has data to send, the device receives an overhead message from the AN containing a Network Access Priority (NAP) parameter defining a minimum priority level for initiating network access. The device determines whether its DAP level is equal to or greater than the NAP parameter. If not, the device periodically repeats the receiving and determining steps until the stored DAP level is determined to be equal to or (Continued)

greater than the NAP parameter received from the AN. When the stored DAP level is equal to or greater than the NAP parameter, the device initiates network access. The device may perform and pass a Persistence Test before transmitting the data on an access channel (ACH).

19 Claims, 8 Drawing Sheets

Related U.S. Application Data

(60) Provisional application No. 61/625,157, filed on Apr. 17, 2012.

(51) Int. Cl.
*H04W 28/02* (2009.01)
*H04W 74/08* (2009.01)
*H04W 74/00* (2009.01)
*H04W 48/12* (2009.01)

(52) U.S. Cl.
CPC ..... *H04W 74/006* (2013.01); *H04W 74/0875* (2013.01); *H04W 48/12* (2013.01)

(56) References Cited

U.S. PATENT DOCUMENTS

| 8,660,009 | B2 | 2/2014 | Dahlen |
| 2005/0099944 | A1 | 5/2005 | Cha |
| 2006/0239283 | A1 | 10/2006 | Fitzgerald |
| 2006/0268768 | A1 | 11/2006 | Harris et al. |
| 2007/0064720 | A1 | 3/2007 | Sterenson et al. |
| 2008/0037463 | A1 | 2/2008 | Gopal |
| 2008/0279210 | A1* | 11/2008 | Naka ............... H04W 28/18 370/448 |
| 2009/0062887 | A1* | 3/2009 | Mass ............... A61N 1/37282 607/60 |
| 2009/0207825 | A1* | 8/2009 | Koo ............... H04W 72/1242 370/338 |
| 2010/0124172 | A1* | 5/2010 | Tenny ............... H04W 24/08 370/242 |
| 2010/0222023 | A1* | 9/2010 | Aoyama ........... H04W 76/021 455/411 |
| 2011/0268026 | A1* | 11/2011 | Ronneke ......... H04W 72/1242 370/328 |
| 2011/0270984 | A1 | 11/2011 | Park |
| 2011/0307932 | A1 | 12/2011 | Fan et al. |
| 2012/0028661 | A1 | 2/2012 | Fang et al. |
| 2013/0232555 | A1* | 9/2013 | Zhang ............... H04W 12/08 726/4 |

OTHER PUBLICATIONS

Samsung, Solution for using Penalty for Access Class Barring, 3GPP TSG SA WG2 Meeting #79E, TD S2-103111, Jul. 6-13, 2010.
3GPP: "3rd Generation Partnership Project; Technical Specification Group Services and System Aspects; Service accessibility (Release 11)", Standard; 3GPP TS 22 011, V11.2 0, Dec. 21, 2011.

\* cited by examiner

METHOD AND COMMUNICATION DEVICE FOR CONTROLLING ACCESS TO A WIRELESS ACCESS NETWORK

CROSS-REFERENCE TO RELATED APPLICATIONS

This application is a continuation of U.S. application Ser. No. 13/558,665, filed Jul. 26, 2012, which claims the priority benefit under 35 U.S.C. § 119(e) of U.S. Provisional Application No. 61/625,157, filed Apr. 17, 2012, the disclosures of which are incorporated herein by reference in their entireties.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The present disclosure relates to wireless communication networks. More particularly, and not by way of limitation, particular embodiments of the present disclosure are directed to a method and wireless communication device for controlling access to a wireless Access Network (AN) by wireless communication devices, particularly Machine-to-Machine (M2M) communication devices.

BACKGROUND

In current wireless Access Networks (ANs), a wireless communication device sends a signaling message or data over an Access Channel (ACH) before the network grants the device access with a dedicated channel. The ACH is usually shared among wireless devices, and congestion may occur on the ACH if many devices attempt to access the network within a short period of time. In order to minimize congestion on the ACH, most wireless technologies utilize "Persistence Test with Backoff" mechanism referred to herein for simplicity as the "Persistence Test".

When utilizing the Persistence Test, the wireless network usually defines a number of device classes. Each device class is assigned a persistence value, which is usually broadcast by the AN. Each device is configured to associate with a device class. When a device attempts to send data to the AN through the ACH, the device must perform and pass the Persistence Test before the device can send any data to the AN. The device generates a random persistence value and is considered to have passed the test when the random persistence value it generated is equal to or larger than the persistence value assigned to the device's associated class. If the test is not passed, the device waits for a "Backoff" time period and then performs another Persistence Test with a new random value. Thus, the test essentially acts as a throttle. Even though a large number of devices attempt to send data within a short period of time, this test can help to reduce potential ACH collisions and hence reduce the congestion.

The Persistence Test with Backoff mechanism works well most of the time in existing wireless networks such as Global System for Mobile Communications (GSM) and Code Division Multiple Access (CDMA) networks where most of the calls are voice-call related or are packet-data calls that require human intervention. However, wireless communications are changing, and Machine-to-Machine (M2M) communication is gaining traction. M2M communications involve communication (using wired or wireless means, or a combination of both) between two machines without human intervention. It is noted here that the term "M2M communication" is also referred to as "Machine Type Communication (MTC)" in certain literature. However, for the sake of consistency, only the term "M2M communication" is used in the discussion herein. Some examples of M2M communications are: smart metering (e.g., remote reading of a utility meter), healthcare monitoring (e.g., remote monitoring of a patient's heart rate), agricultural monitoring (e.g., monitoring of a crop condition), fleet management tracking (e.g., monitoring current status of trucks on road), security surveillance (e.g., automatic, real-time monitoring of a building or complex), billing transactions, inventory management (e.g., through monitoring of Point of Sale (POS) transactions in a supermarket) etc. These M2M communications typically use M2M communications-capable sensors or diagnostic devices (which may perform the metering, monitoring, etc., mentioned earlier) on one end and an M2M user device or receiver on the other end to receive data (e.g., wirelessly via a cellular Access Network as discussed below with reference to FIG. 1) from the sensor devices and process the data as per desired M2M service (e.g., utility metering service, healthcare monitoring service, billing preparation service, etc.).

With M2M communication and M2M-type devices introduced to the market, the number of wireless devices an access network needs to support has grown exponentially. There are many different types of M2M devices. Some are delay tolerant while some are time critical; some may only send data once a month while others send data more frequently; some may be fixed while others are mobile. In fact, unlike a legacy wireless device (i.e., a mobile phone including smart phone), there can be many different M2M device types, each with different characteristics and access requirements.

One of the potential M2M device types has the time/delay tolerance characteristic. For example, a utility meter with wireless access can be this type of M2M device. Depending on the application, there many such devices may be deployed within a small geographic area (e.g., gas meter, electricity meter). During normal operation, this type of device may only need to send data to the network once a day or less often. The service provider of these devices can also schedule the network access for these devices during off-peak hours so that normal wireless communication is not impacted.

During normal operation, the existing Persistence Test mechanism and the configured communication schedule enables the network to handle a large number of M2M devices and does not add much burden to the network (i.e. congestion issue). But the Persistence Test mechanism is still not enough to handle possible congestion under some external events such as recovery after a power outage. These external events may trigger a large number of M2M devices (for example, time tolerant devices such as utility meters) to reconnect with the network simultaneously. Even with the Persistence Test mechanism in place, there can be large number of devices trying to connect to the network through the ACH at the same time, which causes collisions and leads to RF-congestion. Large scale RF-congestion may also lead to core network congestion.

SUMMARY

As described above, the Persistence Test mechanism essentially acts as a throttle for a device access class. Any devices belong to this access class have to be under the control of the persistence value for this access class. The persistence value does not discriminate with respect to device access priority. There can be many devices assigned to same device access class, but depending on the application associated with each device, the access priority of these devices could be different. For example, an M2M device for a water meter may have lower access priority compared to the access priority of an M2M device for an alarm sensor even though both devices belong to same device access class. During the congestion situation, adjusting the persistence value can control the overall congestion situation of the access channel, but it does not discriminate whether a device should have higher or lower access priority from the application perspective.

To better control RF-congestion and network overload problem especially during some special events, the present disclosure provides the following enhancements:

Define "Device Access Priority" (DAP) levels. The DAP may be assigned to M2M devices to identify each device's access priority from a network perspective. Different levels may be assigned to different M2M device types based on the device characteristics and functionality. For example, the DAP level for an alarm sensor may typically be higher than the DAP level of a water meter.

Define "Network Access Priority" (NAP) parameter. This parameter identifies the access priority level that is allowed to access the network. If an M2M device's DAP level is less than the NAP parameter broadcast by a serving base station, the M2M device is not allowed to initiate a network access for a period of time. If the M2M device's DAP level is equal to or larger than the broadcast NAP parameter, the device is allowed to access the network, and the Persistence Test may be used to determine when the device is allowed to send data over the ACH.

The NAP parameter is broadcast by the network. When the NAP parameter is not broadcast by the network, or is set to a default value (for example, 0), the prioritization feature is disabled.

The network may change the value of the NAP parameter (for example, there may be j levels for the NAP parameter) based on the loading/congestion conditions.

The DAP level for each M2M device is either pre-configured in the M2M device or assigned by the network through other means (for example, during session establishment or update, over-the-air provisioning, and the like). Devices that do not have a DAP level assigned may be viewed as having the feature disabled (i.e., the device does not need to compare a DAP level with the NAP parameter to determine whether the device is allowed to access the network based on access priority checking).

Optionally, a DAP/NAP timer may also be implemented to function as a backoff mechanism such that if the device's configured DAP level is less than the NAP parameter broadcast by the network, the M2M device is not allowed to initiate a network access for a random period (or configured period) of time before re-scanning the NAP parameter broadcast by the network. It should be noted that instead of using a timer, the device may simply keep monitoring the broadcast messages that carry the NAP parameter.

After re-scanning, the M2M device is allowed to initiate a network access (for example, by performing the Persistence Test) if its configured DAP level is equal to or larger than the current broadcast NAP parameter, or if the current NAP parameter indicates the prioritization feature is disabled. If the configured DAP level is less than the current broadcast NAP parameter, the M2M device is still not allowed to initiate a network access.

Alternatively, the prioritization feature may be implemented in the following manner:

The DAP level may be set for different class values where each class corresponds to different M2M device characteristics. Thus, each M2M device is configured to be a DAP class depending on each device's characteristics.

The network may broadcast one or more NAP classes in a broadcast overhead message. If the M2M device's configured DAP class is equal to one of the NAP classes broadcast in the overhead message, the device is not allowed to initiate network access for a period of time as mentioned above. Alternatively, if the M2M device's configured DAP class is equal to one of the NAP classes broadcast in the overhead message, the device is allowed to initiate network access; otherwise not.

In a special case, if the device has data classified as "emergency" (for example a "911" call or a call from an eHealth monitoring device reporting a life-threatening event), the NAP/DAP checking mechanism may be bypassed, and the device proceeds directly to persistence checking or is provided with priority access.

The disclosed network access priority control method can help to reduce or prevent an overload/congestion condition due to sudden external events. The disclosed method is a complement to the existing Persistence Test mechanism, and when utilized together, forms a two-step process for network access. The first step (the disclosed method) is to disqualify certain devices and disallow these devices from initiating network access. Those devices that pass the first step are allowed to initiate network access and apply the Persistence Test mechanism to further mitigate potential collision/congestion.

The disclosed method is applicable to any wireless communication devices, but it is especially useful for M2M devices, and particularly those that are time/delay tolerant. This type of device (for example, a utility meter) usually does not have critical data to send and can tolerate longer delays before sending its data to the network In one embodiment, the present disclosure is directed to a method of controlling access to a wireless Access Network (AN) by a wireless communication device. The method includes the steps of storing in a non-transitory memory in the wireless communication device, a Device Access Priority (DAP) level based on characteristics of the wireless communication device; and when the wireless communication device has data to send, receiving by a radio receiver in the wireless communication device, a message from the AN containing a Network Access Priority (NAP) parameter, which defines a minimum priority level that the wireless communication device must meet to be allowed to initiate network access. The method also includes determining by a processor in the wireless communication device, whether the stored DAP level is equal to or greater than the NAP parameter received from the AN. When the stored DAP level is determined to be less than the NAP parameter received from the AN, the device periodically repeats the receiving and determining steps until the stored DAP level is determined to be equal to or greater than the NAP parameter received from the AN. When the stored DAP level is determined to be equal to or greater than the NAP parameter received from the AN, the device initiates network access. The initiating step may include performing the Persistence Test and transmitting the data on an access channel (ACH) when the Persistence Test is passed.

In another embodiment, the present disclosure is directed to a wireless communication device configured to control access to a wireless AN. The wireless communication device includes a non-transitory memory configured to store a DAP level, wherein the DAP level is based on characteristics of the wireless communication device; and a radio receiver configured to receive a message from the AN containing a NAP parameter when the wireless communication device has data to send. The NAP parameter defines a minimum priority level that the wireless communication device must meet to be allowed to initiate network access. The device also includes a processor configured to determine whether the stored DAP level is equal to or greater than the NAP parameter received from the AN. When the stored DAP level is determined to be less than the NAP parameter received from the AN, the device is configured to periodically receive additional messages from the AN with new NAP parameters, and to determine whether the stored DAP level is equal to or greater than one of the new NAP parameters received from the AN. When the stored DAP level is determined to be equal to or greater than the NAP parameter received from the AN, the device is configured to initiate network access.

The device may be configured to initiate network access by performing the Persistence Test in which the processor generates a random persistence value and determines that the device passed the Persistence Test when the generated random persistence value is equal to or larger than a persistence value assigned by the AN. When the wireless communication device passes the Persistence Test, a radio transmitter in the wireless communication device is configured to transmit on an access channel, the data the device has to send.

In a further embodiment, the present disclosure is directed to a wireless Access Network (AN) configured to control access to the AN by a wireless communication device, wherein the AN includes a processor coupled to a non-transitory memory, wherein when the processor executes computer program instructions stored in the memory, the processor causes the AN to obtain traffic loading and congestion information for the AN; determine a value of a NAP parameter based on the traffic loading and congestion information; and broadcast, utilizing a radio transmitter, an overhead message to the wireless communication device, the overhead message containing the NAP parameter. The NAP parameter defines a minimum priority level that the wireless communication device must meet to be allowed to initiate network access.

In a further embodiment, the present disclosure is directed to a method of controlling access to a wireless AN by a wireless communication device. The method includes the steps of storing in a non-transitory memory in the wireless communication device, a DAP class depending on characteristics of the wireless communication device; and when the wireless communication device has data to send, receiving by a radio receiver in the wireless communication device, a message from the AN containing one or more prohibited NAP classes. A processor in the wireless communication device determines whether the stored DAP class is equal to any of the prohibited NAP classes received from the AN. When the stored DAP class is equal to one of the prohibited NAP classes received from the AN, the device periodically repeats the receiving and determining steps until it is determined that the stored DAP class does not equal any of the prohibited NAP classes received from the AN. When the stored DAP class does not equal any of the prohibited NAP classes received from the AN, the wireless communication device initiates network access.

In a further embodiment, the present disclosure is directed to a method of controlling access to a wireless AN by a wireless communication device. The method includes the steps of storing in a non-transitory memory in the wireless communication device, a DAP class depending on characteristics of the wireless communication device; and when the wireless communication device has data to send, receiving by a radio receiver in the wireless communication device, a message from the AN containing one or more allowed NAP classes. A processor in the wireless communication device determines whether the stored DAP class is equal to any of the allowed NAP classes received from the AN. When the stored DAP class does not equal any of the allowed NAP classes received from the AN, the device periodically repeats the receiving and determining steps until it is determined that the stored DAP class is equal to one of the allowed NAP classes received from the AN. When the stored DAP class is equal to one of the allowed NAP classes received from the AN, the wireless communication device initiates network access.

Advantageously, the present disclosure improves on the existing Persistence Test with Backoff by also discriminating whether a device should have higher or lower access priority from the application perspective. Additionally, instead of letting a device application determine its priority or access class, the solution provides full network control to address the congestion/overload condition. The network operator or service operator can use knowledge of different M2M device characteristics and potential impact on network congestion to optimally control network access priorities. The solution provides full network control and enough flexibility to mitigate network congestion situations when very large numbers of devices are deployed in the coverage area.

BRIEF DESCRIPTION OF THE DRAWINGS

In the following section, the present disclosure will be described with reference to exemplary embodiments illustrated in the figures, in which.

DETAILED DESCRIPTION

Figure 1:
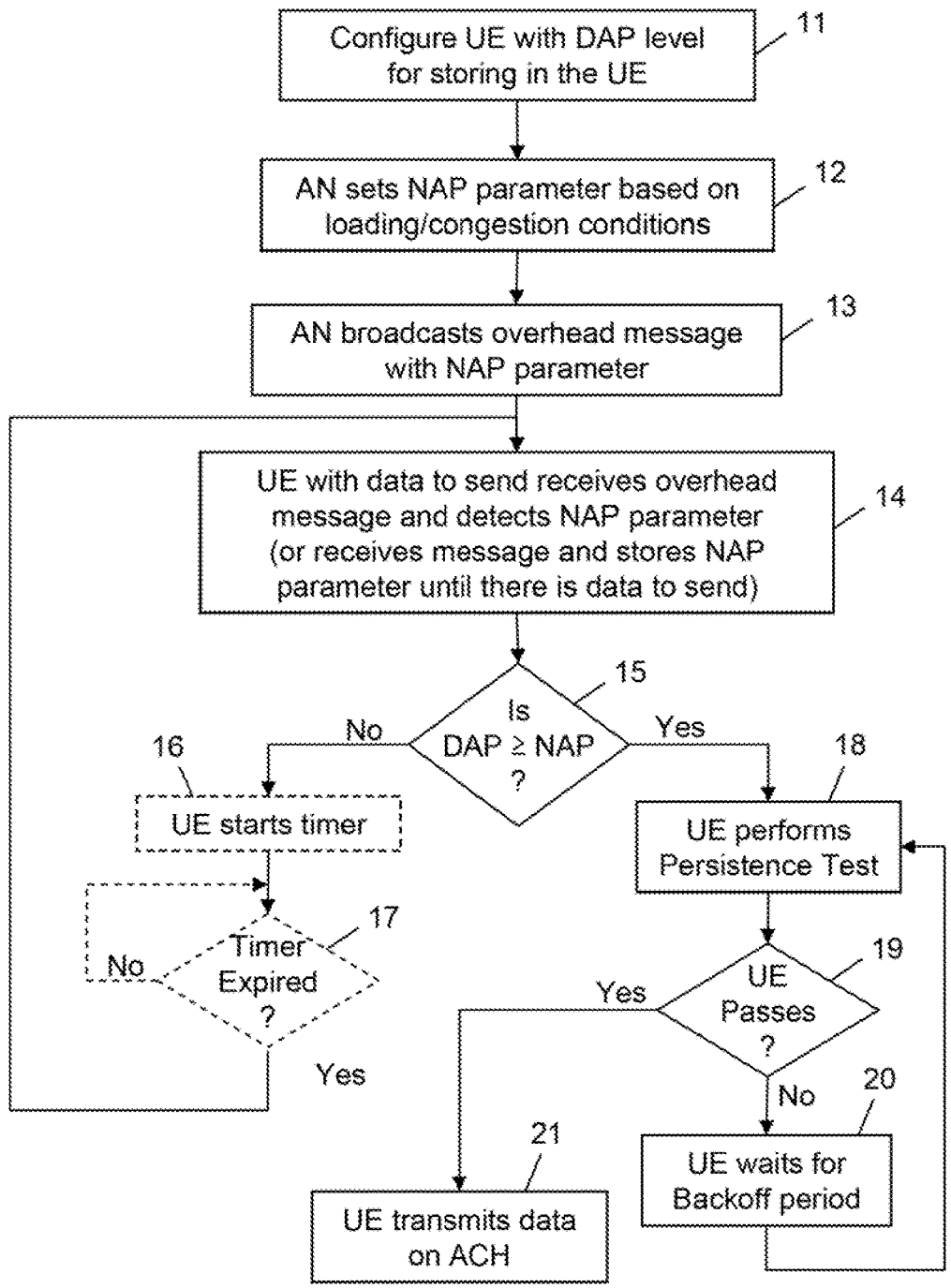
FIG. 1 is a flow chart illustrating an exemplary embodiment of the method of the present invention.

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. It should be understood that the disclosure is described primarily in the context of a 3GPP cellular telephone/data network, but it can be implemented in other forms of cellular wireless networks as well.

This disclosure relates to a system and method for controlling access to a wireless Access Network (AN) by wireless communication devices, particularly Machine-to-Machine (M2M) communication devices.

As noted above, the AN may broadcast the "Network Access Priority" (NAP) parameter in a Network overhead message. The exact structure of the message depends on the Radio Access Technology (RAT) utilized in each AN, but in each case the message includes a NAP field to indicate the NAP parameter. Examples of overhead messages that may be modified to carry the NAP parameter include the System Information Block (SIB) message for Long Term Evolution (LTE) networks and the QuickConfig/SectorParameters message in High Rate Packet Data (HRPD) networks.

The NAP parameter is essentially a threshold that a device's DAP must equal or exceed in order to attempt access. As the traffic load and the number of access attempts increase, the operator may increase the value of the NAP parameter so that only higher priority devices are allowed to initiate network access. As the traffic load and the number of access attempts decrease, the operator may decrease the value of the NAP parameter so that lower priority devices, which were barred from accessing the network during the period of high traffic load, are now allowed to initiate network access.

When network traffic is normal or light, the operator may choose to disable the prioritization feature entirely. This may be done, for example, by broadcasting an overhead message that does not include a NAP parameter. Alternatively, the network may include the NAP parameter in the overhead message, but set it to a default value indicating the prioritization feature is disabled. Subsequently, if the network load increases and access congestion occurs, the network can enable the prioritization feature by broadcasting a non-default NAP value in the overhead message.

It should be noted that wireless/M2M devices that do not have a Device Access Priority (DAP) level assigned ignore the NAP parameter. The DAP level may be assigned to an M2M device at different points in time. For example, the DAP level may be assigned to the device during a pre-configuration stage; the service provider may pre-install the DAP level in the device before deployment; the DAP level may be assigned to the device during session establishment or session update during the device's initial access to the network after installation; the M2M device may be configured with the DAP level through over-the-air provisioning or remote subscription management process; and the like.

Any M2M device that has the DAP level configured compares its DAP level with the NAP parameter received from the network. If the device's DAP level is equal to or greater than the NAP parameter, the device is allowed to initiate network access, and the Persistence Test mechanism is then performed to further determine whether the device can send data on the ACH.

If the device's DAP level is less than the NAP parameter received from the network, the device is not allowed to initiate network access. The device may wait for a period of time (either a randomly generated time period or a pre-determined period of time) before rechecking the NAP parameter broadcast by the network and determining once again whether its DAP level is equal to or greater than the NAP parameter. The NAP and DAP is compared again to determine whether the device is allowed to initiate network access.

It should be noted that specification of the DAP level as being less than, equal to, or greater than the NAP parameter are described only for purposes of illustration. More generally, the AN utilizes the NAP parameter to set conditions that an accessing communication device must meet before the device is allowed to initiate network access.

FIG. 1 is a flow chart illustrating an exemplary embodiment of the method of the present invention. At step 11, the UE is configured with a DAP level identifying the UE's access priority from a network perspective. At step 12, the AN sets the value of the NAP parameter based on current loading/congestion conditions in the network. If network loading/congestion conditions change, the AN may set a different value for the NAP parameter. At step 13, the AN broadcasts an overhead message such as a SIB/QuickConfig message with the NAP parameter. At step 14, the UE, which has data to send, receives the overhead message and detects the NAP parameter. Alternatively, the UE may receive the overhead message containing the NAP parameter before having data to send. In this case, the UE may store the NAP parameter and when the UE has data to send, the UE compares the most current stored NAP parameter to the stored DAP value. This depends on the network design. For certain networks, the UE may not check the overhead message until it has data to send, while in networks using other access technologies, the UE will periodically receive overhead messages regardless of whether there is data to send.

At step 15, the UE determines whether its configured DAP level is equal to or greater than the value of the NAP parameter received from the AN. If not, the method moves to step 16 where the UE may optionally start a timer defining either a predefined time period or a random time period. At step 17, it is determined whether the timer has expired. If not, the UE continues to wait until the timer expires at the end of the time period. When the timer expires, the method returns to step 14, where the UE receives another overhead message.

The timer may be explicitly defined or implicitly defined. When implicitly defined, the UE may periodically monitor the overhead message (or randomly based on an overhead message monitoring rule defined for the access technology) such that the "timer" in this case is the time between two received overhead messages.

If it is determined at step 15 that the UE's configured DAP level is equal to or greater than the value of the NAP parameter received from the AN, the method moves to step 18 where the UE performs the Persistence Test. At step 19, it is determined whether the UE passed the Persistence Test. If not, the UE waits for the Backoff period at step 20 and then performs the Persistence Test again. If the UE passed the Persistence Test, the method moves to step 21 where the UE sends its data on the ACH.

Figure 2:
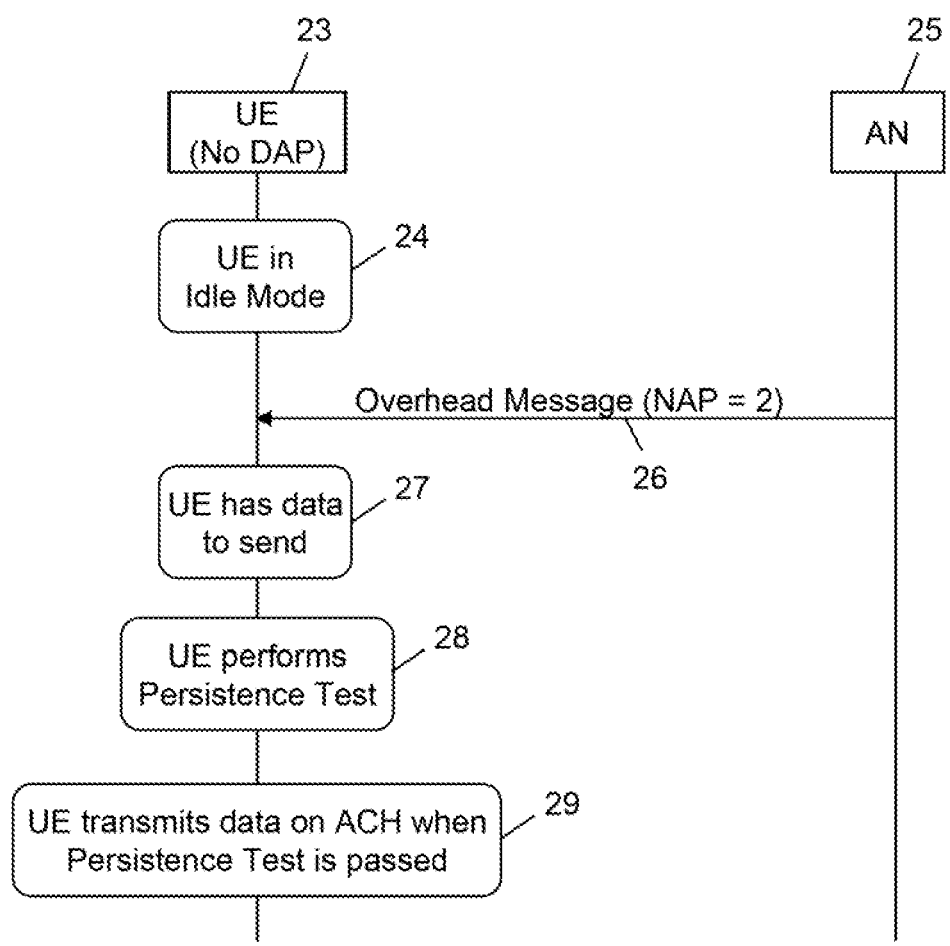
FIG. 2 is a signaling diagram illustrating another exemplary embodiment of the method of the present invention.

FIG. 2 is a signaling diagram illustrating another exemplary embodiment of the method of the present invention. In this embodiment, a UE 23 does not have a DAP level configured. The UE is initially in Idle Mode as indicated at 24 when the UE receives from an AN 25, an overhead message 26 such as a SIB/QuickConfig message. As indicated at 27, the UE later has data to send to the network. However, since the UE is not configured with a DAP level, the UE ignores the NAP parameter received from the AN and performs the Persistence Test at step 28. When the UE passes the Persistence Test, the UE sends its data on the ACH at step 29.

Figure 3:
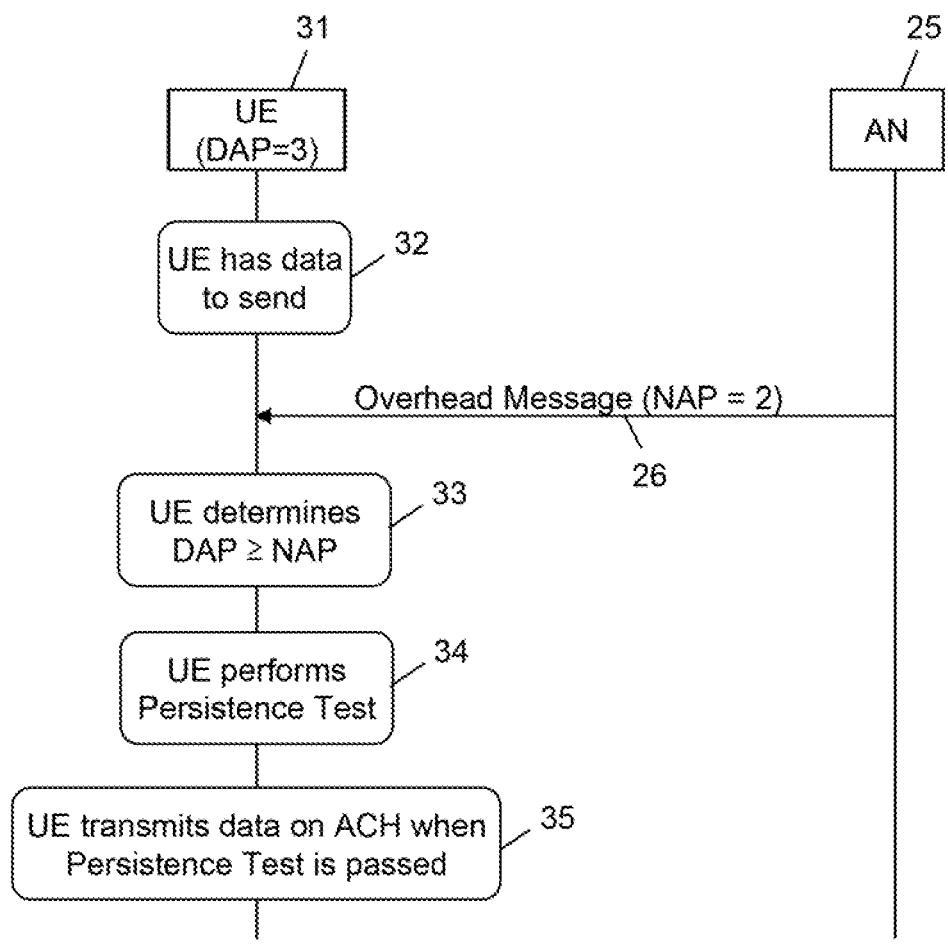
FIG. 3 is a signaling diagram illustrating another exemplary embodiment of the method of the present invention.

FIG. 3 is a signaling diagram illustrating another exemplary embodiment of the method of the present invention. In this embodiment, a UE 31 has a DAP level configured at level 3, and as indicated at 32, has data to send to the network. When the UE receives the overhead message 26 from the AN 25 indicating a NAP parameter with a value of 2, the UE determines at step 33 that its configured DAP level is greater than the received NAP parameter. Therefore, at step 34, the UE performs the Persistence Test. When the UE passes the Persistence Test, the UE sends its data on the ACH at step 35.

Figure 4:
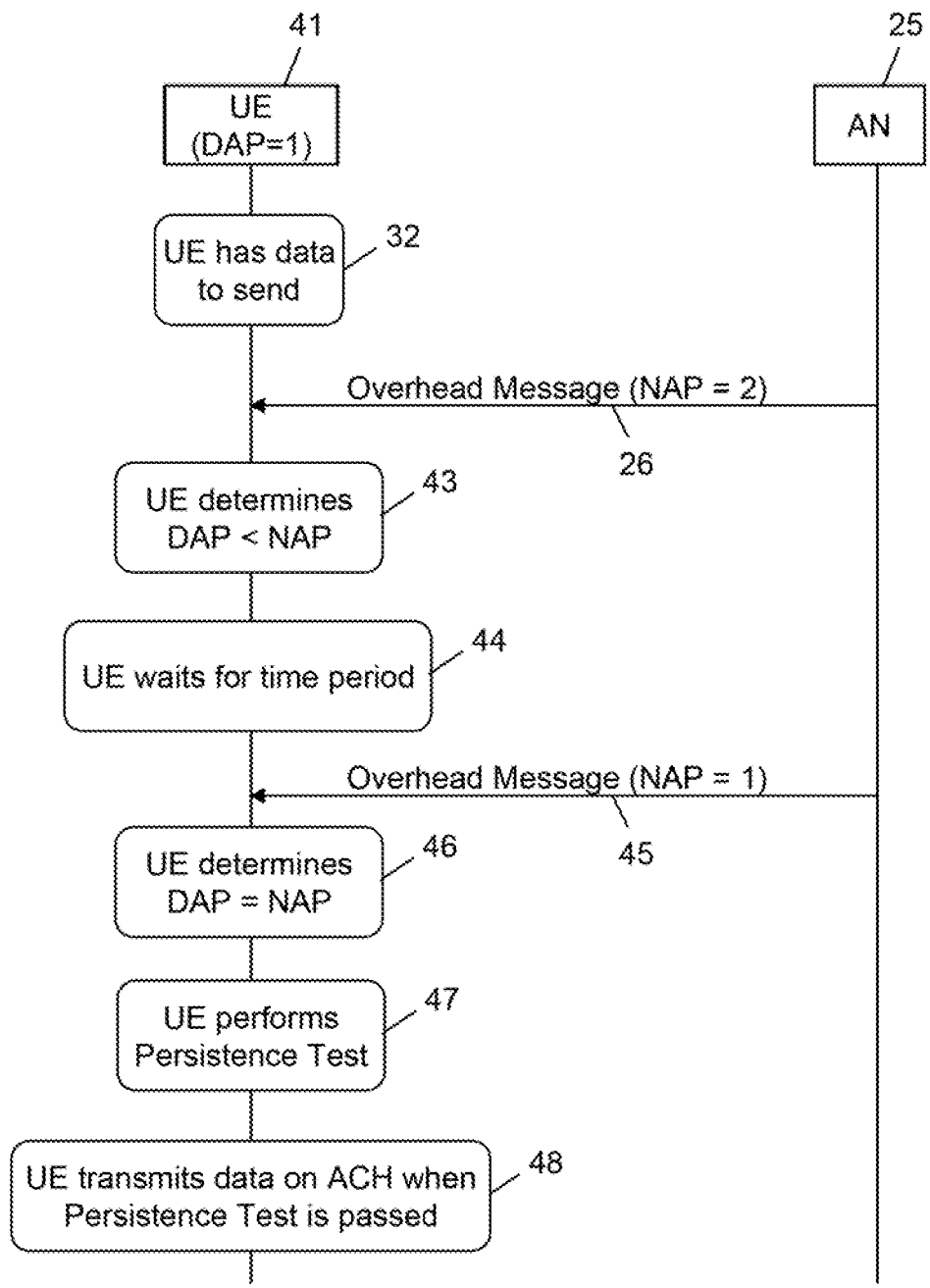

FIG. 4 is a signaling diagram illustrating another exemplary embodiment of the method of the present invention. In this embodiment, a UE 41 has a DAP level configured at level 1, and as indicated at 42, has data to send to the network. When the UE receives the overhead message 26 from the AN 25 indicating a NAP parameter with a value of 2, the UE determines at step 43 that its configured DAP level is smaller than the received NAP parameter, so the UE is not allowed to initiate network access for a period of time (for example, a timer is initiated and countdown started at step 44). When the time period expires, the UE receives another overhead message 45 from the AN 25 indicating a NAP parameter with a new value of 1. At step 46, the UE determines that its configured DAP level is equal to the new NAP parameter. Therefore, at step 47, the UE performs the Persistence Test. When the UE passes the Persistence Test, the UE sends its data on the ACH at step 48.

Figure 5:
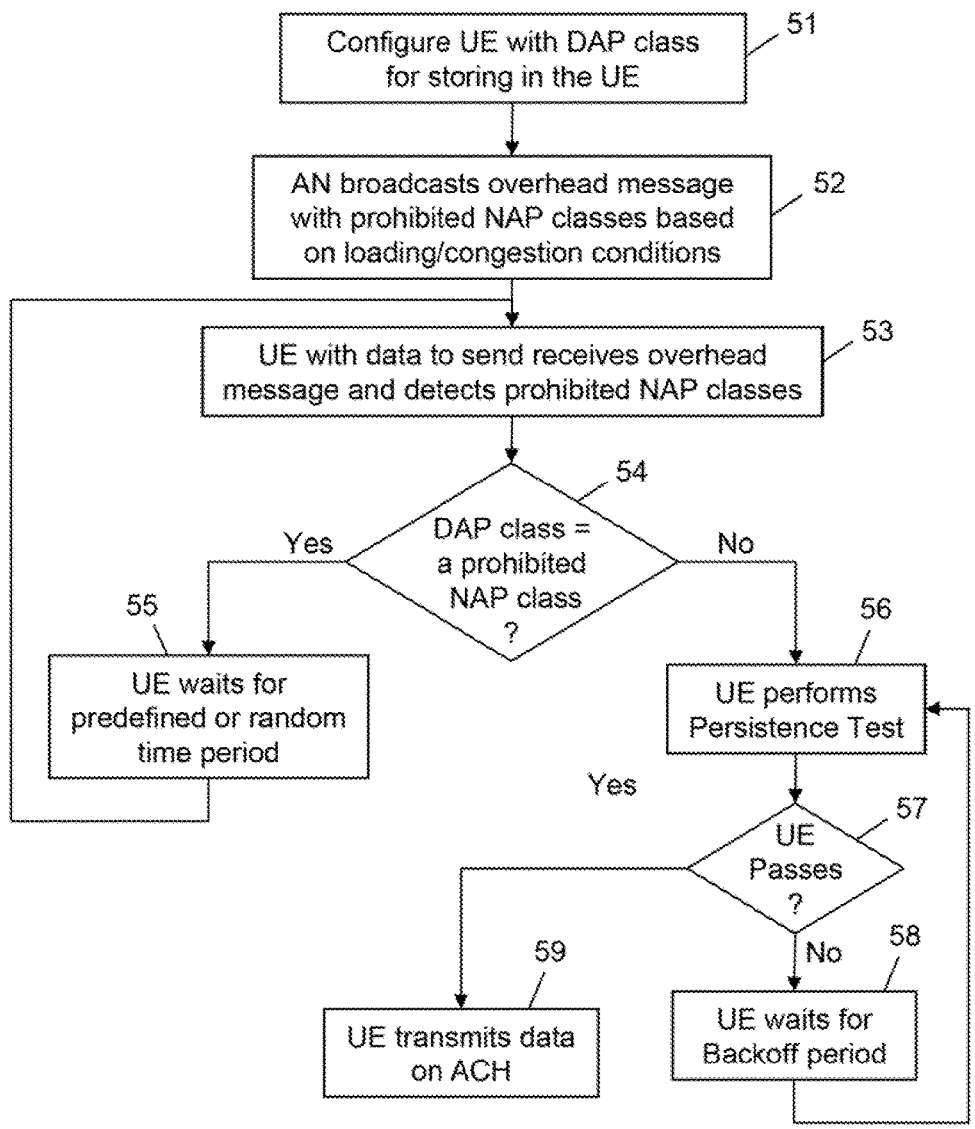
FIG. 5 is a flow chart illustrating an alternative exemplary embodiment of the method of the present invention.

FIG. 5 is a flow chart illustrating an alternative exemplary embodiment of the method of the present invention. At step 51, the UE is configured with a DAP class. The DAP level may be set for different class values where different classes correspond to different M2M device characteristics. Thus, each M2M device is configured to belong to a DAP class depending on each device's characteristics. At step 52, the AN broadcasts an overhead message such as a SIB/QuickConfig message with one or more prohibited NAP classes based on current network loading/congestion conditions. When network loading/congestion increases, the AN may set additional NAP classes as prohibited classes, and vice versa. At step 53, the UE, which has data to send, receives the overhead message and detects the prohibited NAP classes.

At step 54, the UE determines whether its configured DAP class is equal to one of the prohibited NAP classes received from the AN. If so, the method moves to step 55 where the UE waits for either a predefined time period or a randomly generated time period. The method then returns to step 53 where, the UE receives another overhead message and detects the prohibited NAP classes. If network loading/congestion conditions have changed, the AN may broadcast more prohibited NAP classes (if network loading/congestion has increased) or fewer prohibited NAP classes (if network loading/congestion has decreased) in the overhead message.

However, if it is determined at step 54 that the UE's configured DAP class is not equal to any of the prohibited NAP classes received from the AN, the method moves to step 56 where the UE performs the Persistence Test. At step 57, it is determined whether the UE passed the Persistence Test. If not, the UE waits for the Backoff period at step 58 and then performs the Persistence Test again. If the UE passed the Persistence Test, the method moves to step 59 where the UE sends its data on the ACH.

Figure 6:
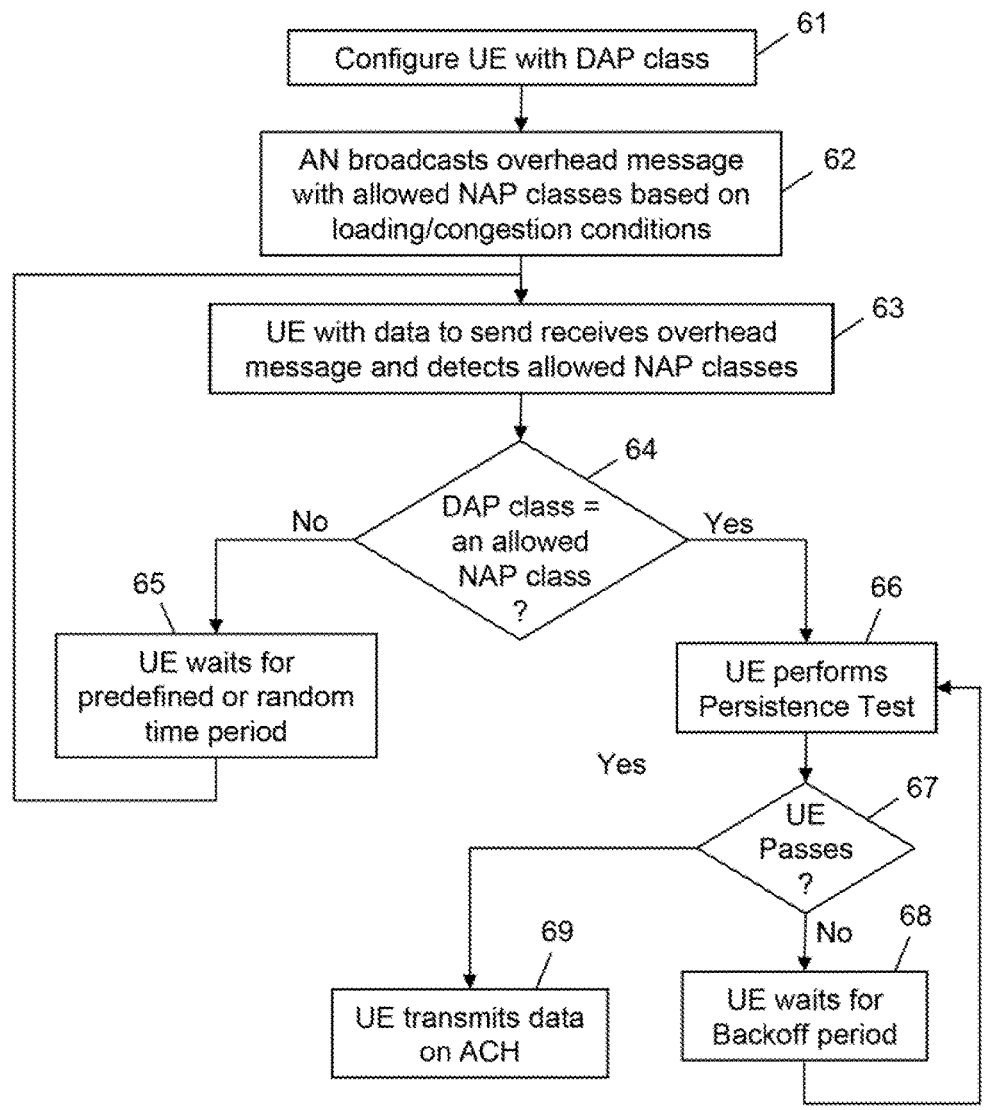
FIG. 6 is a flow chart illustrating another alternative exemplary embodiment of the method of the present invention.

FIG. 6 is a flow chart illustrating an alternative exemplary embodiment of the method of the present invention. At step 61, the UE is configured with a DAP class as described in relation to FIG. 5 above. At step 62, the AN broadcasts an overhead message such as a SIB/QuickConfig message with one or more allowed NAP classes based on network loading/congestion conditions. When network loading/congestion increases, the AN may set fewer NAP classes as allowed classes, and vice versa. At step 63, the UE, which has data to send, receives the overhead message and detects the allowed NAP classes.

At step 64, the UE determines whether its configured DAP class is equal to any of the allowed NAP classes received from the AN. If not, the method moves to step 65 where the UE waits for either a predefined time period or a randomly generated time period. The method then returns to step 63 where, the UE receives another overhead message and detects the allowed NAP classes. If network loading/congestion conditions have changed, the AN may broadcast fewer allowed NAP classes (if network loading/congestion has increased) or additional allowed NAP classes (if network loading/congestion has decreased) in the overhead message.

However, if it is determined at step 64 that the UE's configured DAP class is equal to one of the allowed NAP classes received from the AN, the method moves to step 66 where the UE performs the Persistence Test. At step 67, it is determined whether the UE passed the Persistence Test. If not, the UE waits for the Backoff period at step 68 and then performs the Persistence Test again. If the UE passed the Persistence Test, the method moves to step 69 where the UE sends its data on the ACH.

Figure 7:
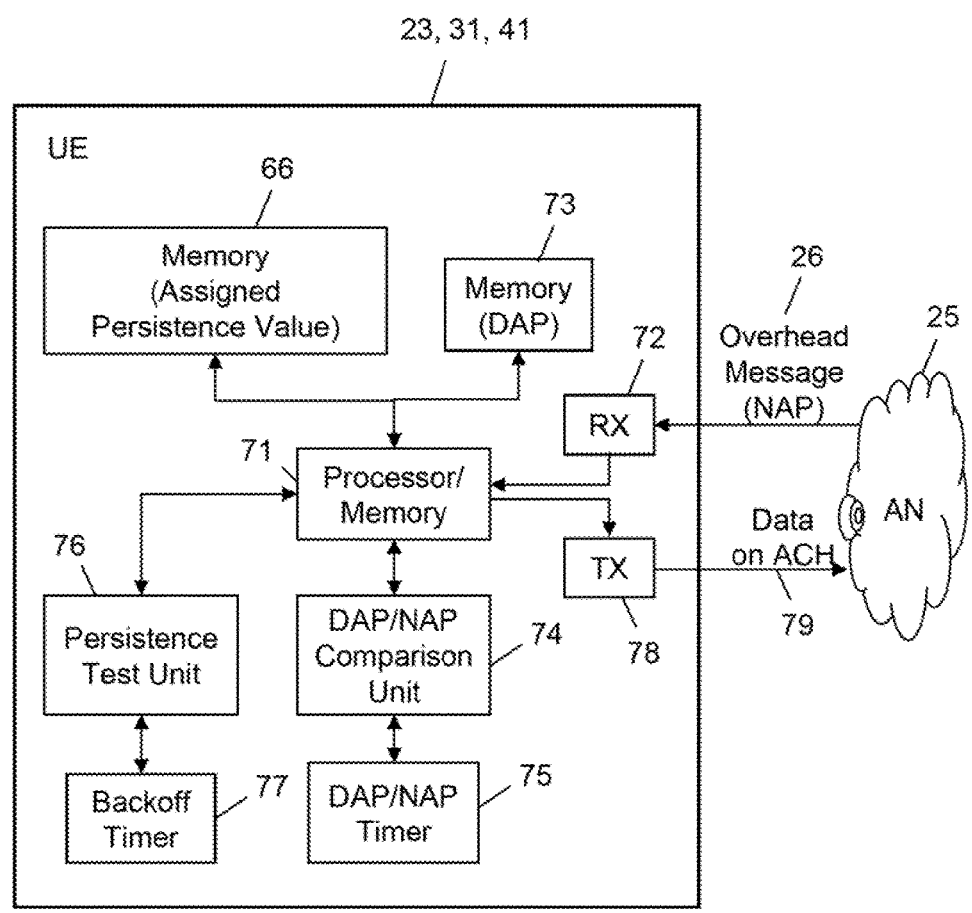
FIG. 7 is a simplified block diagram of a wireless communication device in an exemplary embodiment of the present invention.

FIG. 7 is a simplified block diagram of a wireless communication device such as UE 23, 31, 41 in an exemplary embodiment of the present invention. The operation of the UE may be controlled by a processor 71 executing computer program instructions stored on a non-transitory memory. A radio receiver (RX) 72 receives the overhead message 26 containing the NAP parameter from the AN 25 and supplies the NAP parameter to the processor. The processor reads the stored DAP level from a memory 73 and compares the stored DAP level with the received NAP parameter in a DAP/NAP comparison unit 74. In accordance with the method embodiments described above, if the DAP does not meet the NAP conditions, the UE is not allowed to make an access attempt. A DAP/NAP timer 75 determines when the UE can receive another overhead message and perform the DAP/NAP comparison again.

When the UE determines the DAP level meets the NAP parameter conditions (for example, the DAP level is equal to or greater than the NAP parameter), the processor 71 causes a Persistence Test unit 76 to perform the Persistence Test. If the test is not passed, a Backoff timer 77 determines when the UE can perform the Persistence Test again. When the Persistence Test is passed, the processor causes a radio transmitter (TX) 78 to transmit the UE's data on the ACH 79 to the AN 25.

Figure 8:
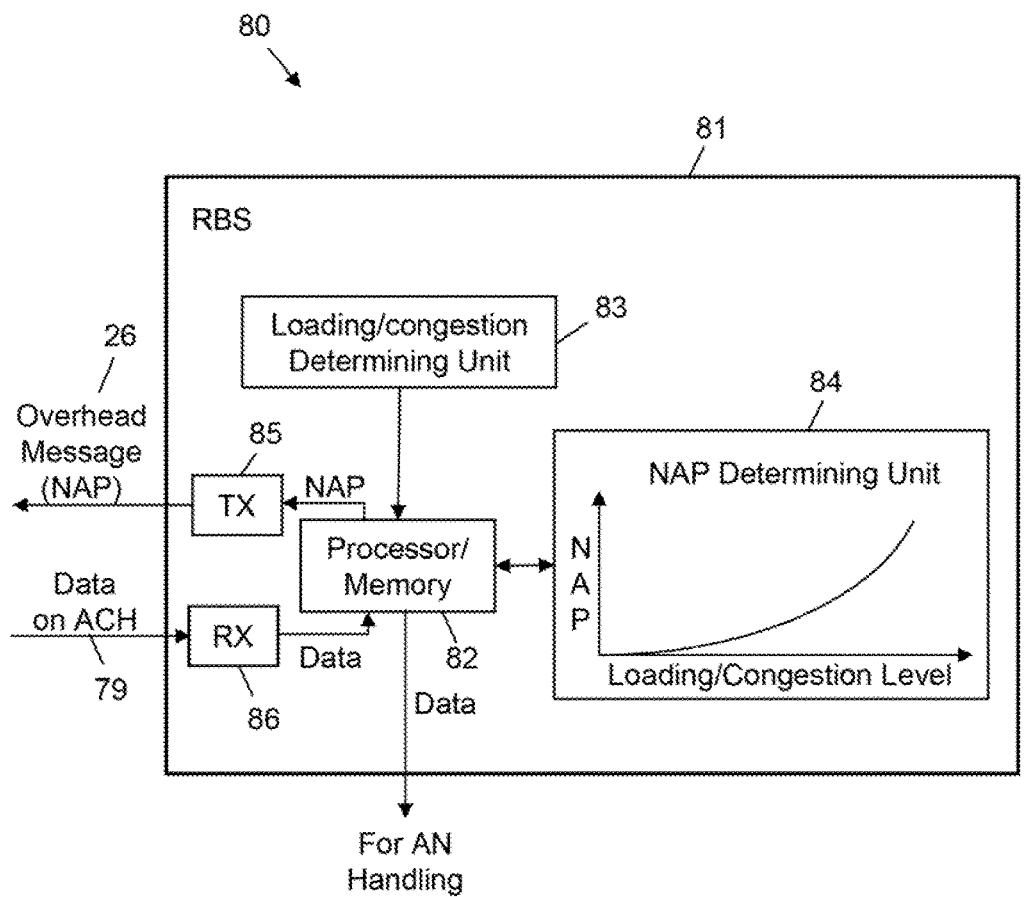
FIG. 8 is a simplified block diagram of a Network Access Priority (NAP) mechanism in the Access Network (AN) in an exemplary embodiment of the present invention.

FIG. 8 is a simplified block diagram of a NAP mechanism 80 in the AN 25 in an exemplary embodiment of the present invention. The NAP mechanism is illustrated in this example as being implemented in a Radio Base Station (RBS) 81, but may be implemented in other ways as well. For example, the NAP mechanism may be implemented in a Base Station Controller (BSC) (not shown), may be distributed across several AN nodes, or may be implemented as a standalone AN component.

Operation of the NAP mechanism may be controlled by a processor 82 executing computer program instructions stored on a non-transitory memory. A Loading/Congestion determining unit 83 provides information to the processor regarding the network traffic loading and congestion on the ACH 79. The processor may control a NAP determining unit 84 to determine an appropriate NAP parameter based on the network loading/congestion. The processor sends the NAP parameter to a radio transmitter (TX) 85, which transmits the NAP parameter in the overhead message 26. Once the UE has successfully performed the DAP/NAP comparison and the Persistence Test, a radio receiver (RX) 86 in the RBS receives the UE's data on the ACH and supplies it to the processor 82. The processor may forward the data to other nodes in the AN for handling.

If the device has data classified as "emergency", the NAP/DAP checking mechanism may be bypassed in any of the above embodiments.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of controlling access to a wireless Access Network (AN) by a wireless communication device, the method comprising the steps of:
   when the wireless communication device has data to send, receiving, by a radio receiver in the wireless communication device, a first message from the AN indicating a first set of one or more allowed Network Access Priority (NAP) classes;
   determining, by a processor in the wireless communication device, whether a Device Access Priority (DAP) class assigned to the wireless communication device is in the first set of one or more allowed NAP classes indicated by the first message received from the AN, wherein the assigned DAP class is based on one or more functional characteristics of the wireless communication device, the one or more functional characteristics comprising a mobility characteristic;
   if the assigned DAP class is not in the first set of one or more allowed NAP classes, refraining from initiating network access by the wireless communication device; and
   after a waiting period, repeating the receiving and determining steps with a second set of one or more allowed NAP classes indicated in a second message received from the AN that differs from the first set of one or more allowed NAP classes.

2. The method of claim 1, wherein the second set of one or more allowed NAP classes is controlled by the AN to differ from the first set of one or more allowed NAP classes based on a change in network loading conditions, thereby controlling a number of access requests received by the AN in dependence on network loading conditions.

3. The method of claim 1, further comprising:
   initiating network access by the processor of the wireless communication device when the assigned DAP class is in the first set of one or more allowed NAP classes indicated by the first message received from the AN.

4. The method as recited in claim 3, wherein initiating network access by the processor of the wireless communication device includes the steps of:
   performing a Persistence Test in which the processor generates a random persistence value and determines that the device passed the Persistence Test based on a comparison of the generated random persistence value with a persistence value assigned by the AN; and
   when the wireless communication device passes the Persistence Test, transmitting, on an access channel by a radio transmitter in the wireless communication device, the data the device has to send.

5. The method of claim 1, wherein the first message from the AN indicates the first set of one or more allowed NAP classes to the wireless communication device by indicating a set of one or more prohibited NAP classes from which the first set of one or more allowed NAP classes is inferable.

6. The method of claim 1, wherein the DAP class is assigned to the wireless communication device during an initial session establishment that occurs after installation of the wireless communication device.

7. The method as recited in claim 1, wherein the wireless communication device is a Machine-to-Machine (M2M) communication device.

8. The method as recited in claim 1, wherein the AN is a Long Term Evolution (LTE) access network, and the first message received from the AN is a broadcast overhead message comprising a System Information Block (SIB) message.

9. The method as recited in claim 1, wherein the AN is a High Rate Packet Data (HRPD) network, and the first message received from the AN is a broadcast overhead message comprising a QuickConfig/SectorParameters message.

10. A wireless communication device configured to control access to a wireless Access Network (AN), the wireless communication device comprising:
    a non-transitory memory configured to store a Device Access Priority (DAP) class, wherein the DAP class is based on one or more functional characteristics of the wireless communication device, the one or more functional characteristics comprising a mobility characteristic;
    a radio receiver configured to receive a first message from the AN indicating a first set of one or more allowed Network Access Priority (NAP) classes when the wireless communication device has data to send; and
    a processor configured to determine whether the stored DAP class is in the first set of one or more allowed NAP classes indicated by the first message received from the AN;
    wherein upon determining the stored DAP class is not in the first set of one or more allowed NAP classes, the device is configured to:
      refrain from initiating network access by the wireless communication device; and
      after a waiting period, repeat the receiving and determining steps with a second set of one or more allowed NAP classes indicated in a second message received from the AN that differs from the first set of one or more allowed NAP classes.

11. The wireless communication device of claim 10, wherein the second set of one or more allowed NAP classes is controlled by the AN to differ from the first set of one or more allowed NAP classes based on a change in network loading conditions, thereby controlling a number of access requests received by the AN in dependence on network loading conditions.

12. The wireless communication device of claim 10, wherein the device is configured to initiate network access when the DAP class is in the first set of one or more allowed NAP classes indicated by the first message received from the AN.

13. The wireless communication device of claim 12, wherein the device is configured to:
   initiate network access by performing a Persistence Test in which the processor generates a random persistence value and determines that the device passed the Persistence Test based on a comparison of the generated random persistence value with a persistence value assigned by the AN; and
   when the wireless communication device passes the Persistence Test, transmit, on an access channel by a radio transmitter in the wireless communication device, the data the device has to send.

14. The wireless communication device of claim 10, wherein the first message from the AN indicates the first set of one or more allowed NAP classes to the wireless communication device by indicating a set of one or more prohibited NAP classes from which the first set of one or more allowed NAP classes is inferable.

15. The wireless communication device of claim 10, wherein the DAP class is assigned to the wireless communication device during an initial session establishment that occurs after installation of the wireless communication device.

16. The wireless communication device of claim 10, wherein the wireless communication device is a Machine-to-Machine (M2M) communication device.

17. The wireless communication device of claim 10, wherein the AN is a Long Term Evolution (LTE) access network, and the first message received from the AN is a broadcast overhead message comprising a System Information Block (SIB) message.

18. The wireless communication device of claim 10, wherein the AN is a High Rate Packet Data (HRPD) network, and the first message received from the AN is a broadcast overhead message comprising a QuickConfig/SectorParameters message.

19. A wireless Access Network (AN) node configured to control access to the AN by a plurality of wireless communication devices, wherein the AN node includes a processor coupled to a non-transitory memory, wherein when the processor executes computer program instructions stored in the memory, the processor causes the AN to:
   determine current traffic loading and congestion conditions for the AN; and
   control a number of access requests received by the AN from the plurality of wireless communication devices by performing the steps of:
      determining a set of one or more allowed Network Access Priority (NAP) classes based on the current traffic loading and congestion conditions, wherein the AN reduces the number of access requests received by the AN by setting fewer NAP classes as allowed NAP classes in the set when the current network loading is high or congestion conditions are heavy;
      utilizing a radio transmitter to broadcast an overhead message to the plurality of wireless communication devices, the overhead message indicating the set of one or more allowed NAP classes; and
      receiving an access request from one of the plurality of wireless communication devices only when a Device Access Priority (DAP) class stored in the wireless communication device is in the set of one or more allowed NAP classes,
   wherein the DAP class is dependent on one or more functional characteristics of the wireless communication device, the one or more functional characteristics comprising a mobility characteristic.

* * * * *